United States Patent [19]
Fukui et al.
[11] Patent Number: 4,989,448
[45] Date of Patent: Feb. 5, 1991

[54] CYLINDER RECOGNITION APPARATUS FOR AN INTERNAL COMBUSTION ENGINE

[75] Inventors: Wataru Fukui; Toshio Iwata, both of Himeji, Japan
[73] Assignee: Mitsubishi Denki Kabushiki Kaisha, Tokyo, Japan

[21] Appl. No.: 420,067
[22] Filed: Oct. 11, 1989
[30] Foreign Application Priority Data
Oct. 12, 1988 [JP] Japan ............ 63-254767
Oct. 12, 1988 [JP] Japan ............ 63-254768
Oct. 13, 1988 [JP] Japan ............ 63-255833
[51] Int. Cl.[5] ............ G01M 15/00
[52] U.S. Cl. ............ 73/116; 364/431.03
[58] Field of Search ............ 73/116; 364/431.03; 123/417, 480

[56] References Cited

U.S. PATENT DOCUMENTS 4,700,305 10/1987 Lotterbach et al. ............ 364/431.03
4,899,281 2/1990 Grimaud et al. ............ 364/431.03 X

*Primary Examiner*—Jerry W. Myracle
*Attorney, Agent, or Firm*—Sughrue, Mion, Zinn, Macpeak and Seas

[57] ABSTRACT

A cylinder recognition apparatus has a position sensor which generates output pulses indicating prescribed positions of each piston of the engine. Based on a ratio which is a function of the period and pulses width of the output pulses, a microcomputer recognizes a reference cylinder of the engine and generates a series of data values, each value indicating the reference cylinder or one of the other cylinders of the engine. The data series is temporarily stored in a first shift register as a first series and is compared with a normal series by a checking device to determine if the first series is normal. The first series is provided to an engine controller only if it is determined to be a normal series. A second shift register may be provided for temporarily storing, as a second series, a series which was determined to be normal. A comparator compares the contents of the first and second shift registers to make sure that the first series was correctly transferred from one register to the other. The second series is provided to an engine controller only if the comparator determines that the first and second series are the same. If the two series are not the same, the second series is replaced by a normal series from the first shift register.

4 Claims, 7 Drawing Sheets

CYLINDER RECOGNITION APPARATUS FOR AN INTERNAL COMBUSTION ENGINE

BACKGROUND OF THE INVENTION

This invention relates to a cylinder recognition apparatus which can recognize a prescribed reference cylinder of an internal combustion engine. More particularly, it relates to a cylinder recognition apparatus which can check the accuracy of cylinder recognition data which it generates.

An internal combustion engine is generally equipped with a cylinder recognition apparatus which provides the engine controller with control signals which can be used to determine which cylinder of the engine is firing at a given time. These control signals are used by the engine controller to control the fuel injection, the ignition timing, and other aspects of engine operation.

Particularly when an engine is starting and the engine rotational speed is changing rapidly, there is a tendency for a conventional cylinder recognition apparatus to malfunction and provide erroneous control signals to the engine controller. If the engine controller performs control in accordance with the erroneous control signals, the engine will not operate properly.

SUMMARY OF THE INVENTION

Accordingly, it is an object of the present invention to provide a cylinder recognition apparatus for an internal combustion engine which will not provide erroneous control signals to an engine controller.

A cylinder recognition apparatus according to the present invention recognizes each cylinder of an engine and generates a series of data identifying a prescribed reference cylinder of the engine or one of the other cylinders of the engine. The series of data is stored in a first shift register as a first series. The first series of data is compared with a reference series of data which is normal. The first series of data is provided to an engine controller for use in controlling the engine only when the comparison indicates that the first series is normal.

The cylinder recognition apparatus of the present invention may also comprise a second shift register to which the first series of data is transferred and stored as a second series of data when it is determined to be normal. The second series of data is then transferred from the second shift register to an engine controller. The apparatus may include a comparator for comparing the second series with the first series to make sure that the first series was correctly transferred between the two shift registers. If the first series was correctly transferred, then the second series is supplied to the engine controller. If the first series was incorrectly transferred, then the second series is replaced by the first series, and the new second series is provided to the engine controller.

DESCRIPTION OF THE PREFERRED EMBODIMENTS

Figure 1:
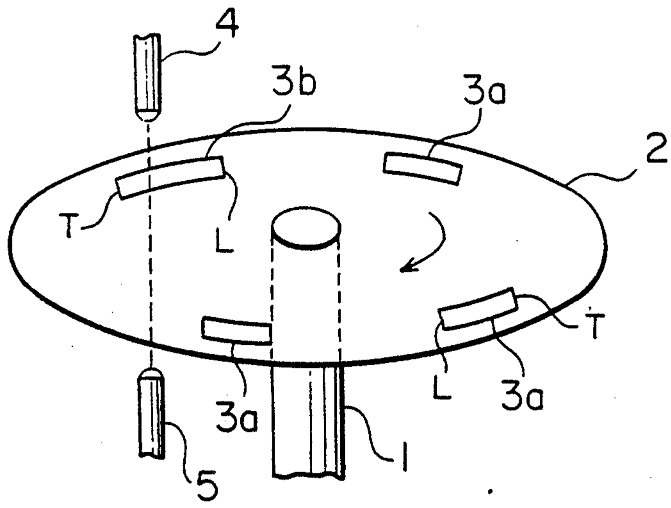
FIG. 1 is a schematic perspective view of a portion of a rotational position sensor for a cylinder recognition apparatus according to the present invention.

A number of preferred embodiments of a cylinder recognition apparatus according to the present invention will now be described while referring to the accompanying drawings. FIG. 1 is a schematic perspective view of a portion of an example of a rotational position sensor which can be employed in the present invention for sensing the rotational position of an engine crankshaft and therefore the position of each cylinder of the engine. As shown in this figure, a rotating shaft 1 is rotated in synchrony with an unillustrated four-cylinder engine. The rotating shaft 1 can be, for example, the shaft of a distributor which is rotated by the cam shaft of the engine in the direction indicated by the arrow. A rotating disk 2 having a plurality of slits **3*a* and 3*b* formed in it is secured to the shaft 1 at the center of the disk 2. Each of the slits 3*a* or 3*b* corresponds to one of the cylinders of the engine, so for a four-cylinder engine, the disk 2 has a total of four slits. The slits 3*a* and 3*b* are equally distant from the center of the rotating disk 2. Three of the slits 3*a* have the same length as one another in the circumferential direction of the disk 2, while the fourth slit 3*b* has a different length from the other slits 3*a*. The fourth slit 3*b* functions as a reference slit and corresponds to a reference cylinder of the engine, which in the present embodiment is cylinder #4, although any of the other cylinders could instead by employed as a reference. The fourth slit 3*b* is illustrated as being longer in the circumferential direction than the other slits 3*a*, but it could instead be made shorter than the others. Each of the slits 3*a* and 3*b* has a leading edge L and a trailing edge T. The leading edges L of all four slits 3*a* and 3*b* are equally spaced around the disk 2 at intervals of 90 degrees. However, since the fourth slit 3*b* is longer than the other slits 3*a*, its trailing edge is offset by a prescribed angle (10 degrees, for example, as measured from the center of the disk 2) with respect to the trailing edges T of the other slits 3*a***.

A light source in the form of a light emitting diode 4 and a light sensor in the form of a phototransistor 5 are aligned with one another on opposite sides of the rotating disk 2. When one of the slits **3*a* or 3*b* is aligned with the light emitting diode 4 and the phototransistor 5, the phototransistor 5** turns on, while at other times it is off.

Figure 2:
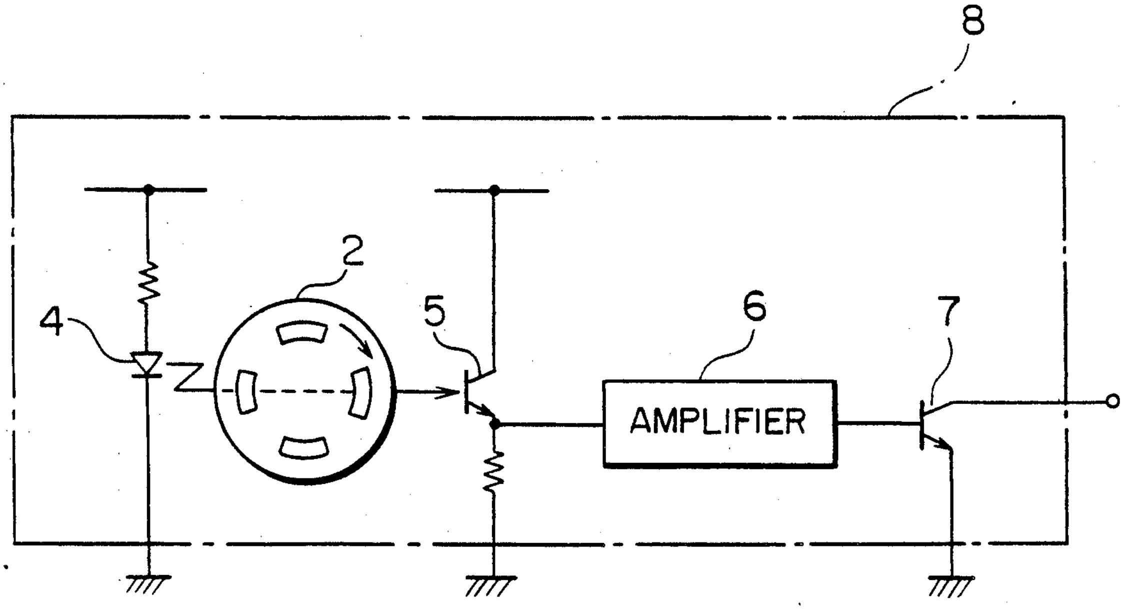
FIG. 2 is a circuit diagram of the position sensor of FIG. 1.

The rotational position sensor, which includes the elements illustrate in FIG. 1, is shown schematically in FIG. 2 and is indicated by reference numeral 8. When the light which is generated by the light emitting diode 4 passes through one of the slits **3*a* or 3*b* of the disk 2 and strikes the phototransistor 5, the phototransistor 5 conducts and current flows through the phototransistor 5 and resistor R2 which is connected to the emitter of the phototransistor 5. An amplifier 6** amplifies the voltage across the resistor R2 and provides the amplified signal to the base of an open-collector output transistor 7.

Figure 3:
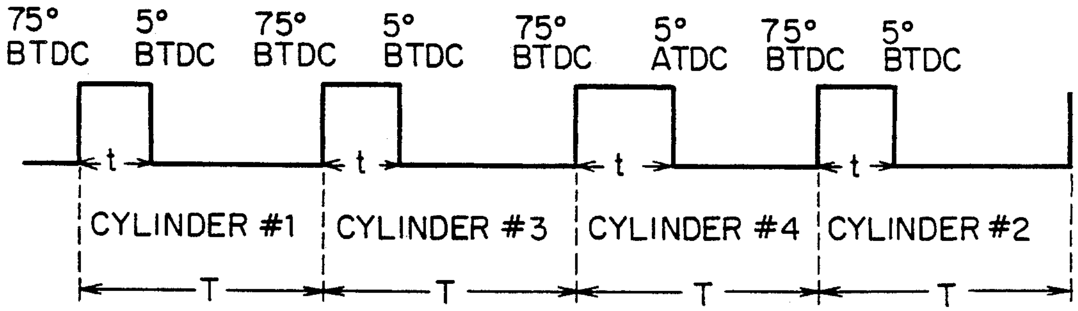
FIG. 3 is a wave form diagram of the output of the position sensor of FIG. 2.

FIG. 3 illustrates the output signal of the rotational position sensor 8. The output signal is in the form of pulses having a rising edge corresponding to the leading edge L and a falling edge corresponding to the trailing edge T of each slit of the disk 2. In FIG. 3, a rising edge of an output pulse occurs when the piston of the corresponding cylinder is at 75 degrees BTDC. For all but the reference cylinder, the falling edge occurs when the piston of the corresponding cylinder is at 5 degrees BTDC, but for the reference cylinder (cylinder #4), the falling edge of the pulses occurs when the piston is at 5 degrees ATDC. However, the piston positions corresponding to the rising and falling edges in FIG. 3 are just examples, and different values can be employed. The pulses have a period T and a pulse width t.

Figure 4:
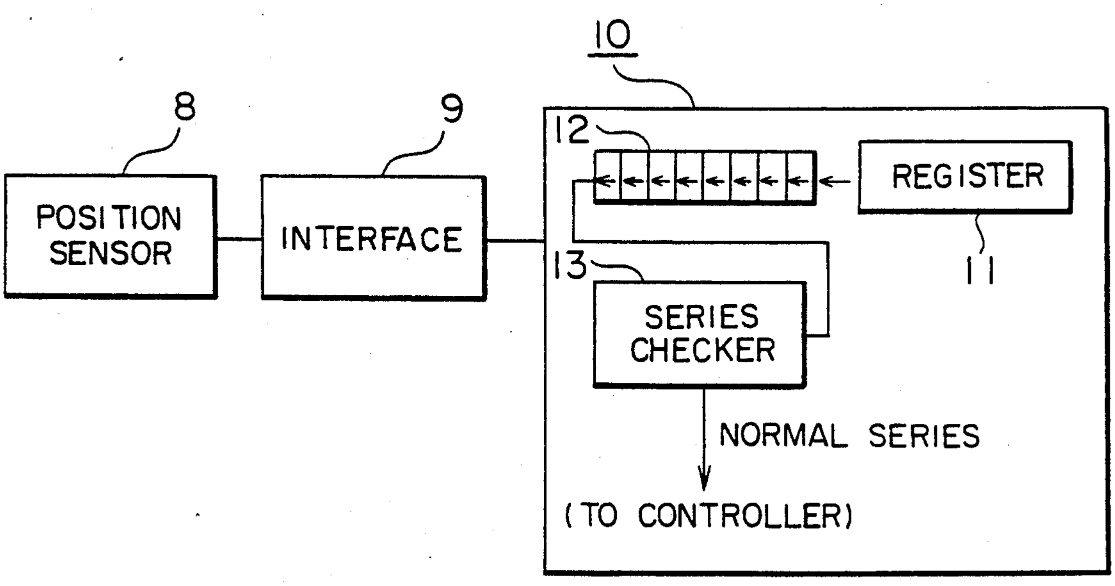
FIG. 4 is a block diagram of a first embodiment of the present invention.

As shown in FIG. 4, the output signal of the position sensor 8 is input to a microcomputer 10 via an interface. The microcomputer 10 determines whether each pulse of the output signal of the position sensor 8 corresponds to the reference cylinder (cylinder #4) or to one of the other cylinders by comparing the ratio $t/T$ or $t/(T-t)$ for each pulse with a reference value. Since the number of degrees of crankshaft rotation between the rising and falling edges of the pulse corresponding to the reference cylinder is greater than for the other cylinders, the ratio $t/T$ or $t/(T-t)$ is greater for the reference cylinder than for the other cylinders, so the microcomputer 10 can easily distinguish the reference cylinder.

When the microcomputer 10 recognizes the reference cylinder, it temporarily stores a first value (a 1 in this embodiment) in an internal register 11, and when it recognizes one of the other cylinders, it temporarily stores a second value (a 0 in this embodiment) in the register 11. The first and second values, i.e., the 1's and the 0's which are stored in the register 11 constitute cylinder recognition data.

Figure 5:
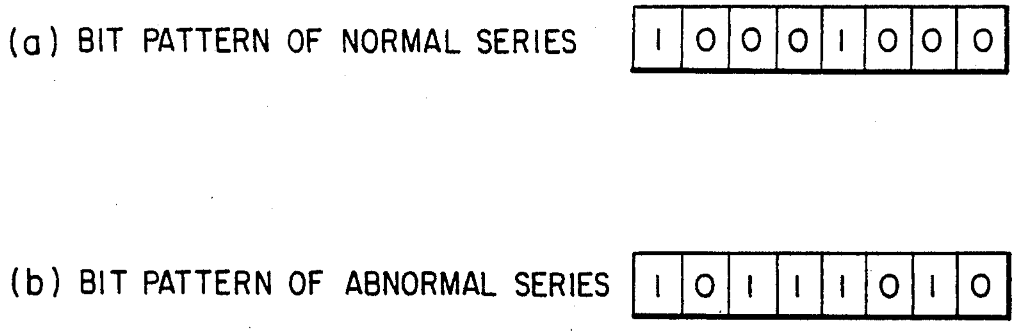
FIG. 5 is an illustration of the bit pattern of an abnormal series and the bit pattern of a normal series of cylinder recognition data.

The contents of the register 11 are successively input to a first shift register 12 and successively shifted to the left. The contents of the first shift register 12 constitute a first data series containing cylinder recognition data for two cycles of the engine, i.e., eight values although the size of the first shift register 12 is not critical. The first shift register 12 is connected to a checking device 13 which determines whether the series which is stored in the first shift register 11 is a normal series or an abnormal series. FIG. 5*a* illustrates an example of a normal series, and FIG. 5*b* illustrates an example of an abnormal series. A normal series is one in which every fourth value is a 1 and the intermediate values are all 0's, whereas an abnormal series is any other series.

If the series in the first shift register 12 is determined to be a normal series, the checking device 13 provides the first series to an unillustrated engine controller, and the first series is used by the controller for engine control.

Figure 6:
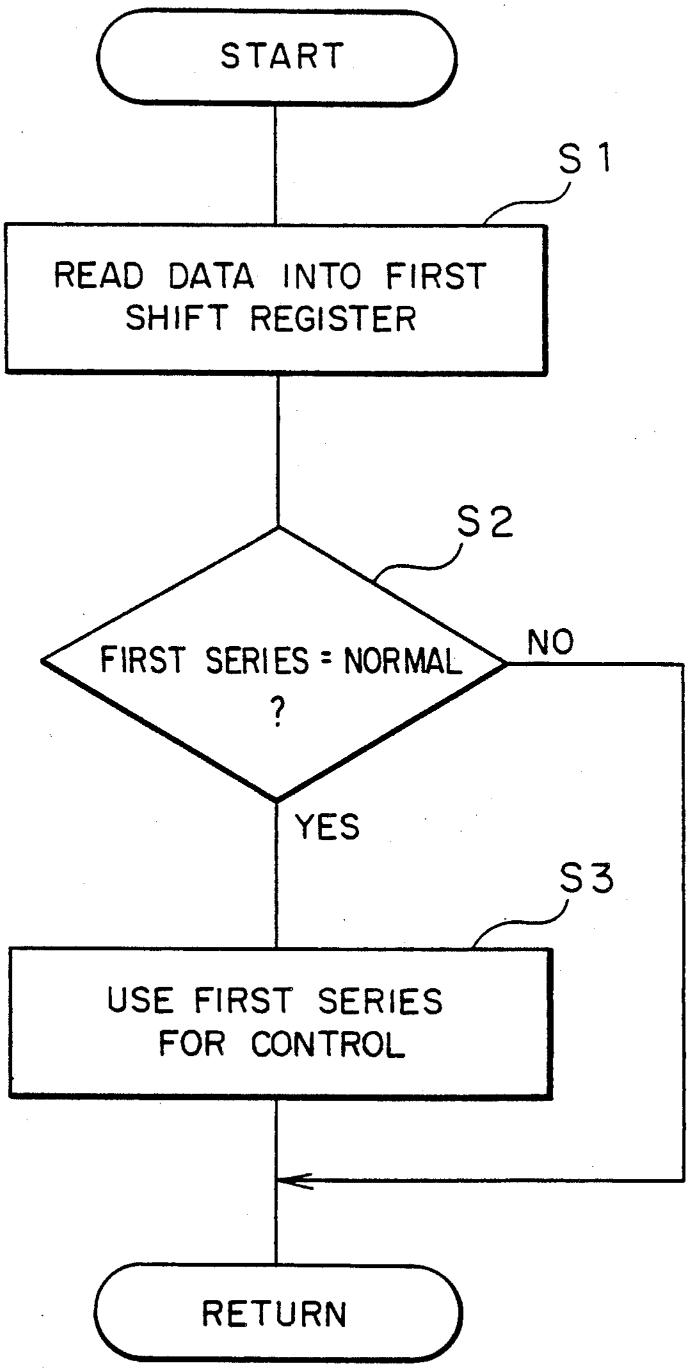
FIG. 6 is a flow chart of the operation of the embodiment of FIG. 5*a*.

FIG. 6 is a flow chart of the operation of the embodiment of FIG. 4. In Step S1, the result of cylinder recognition is stored as a series of data in register 11. Each time a value is input to register 11, the first shift register 12 shifts in the direction of the arrow, and a series of data for two engine cycles is stored. In Step S2, the checking device 13 checks whether the series in the first shift register 12 is a normal series or not by comparing the series in the first shift register 12 with a normal series. If the series in the first shift register 12 is not a normal series, then a return is performed. If the series is determined to be a normal series, then it is provided to the controller, which uses the data for controlling the ignition timing, the fuel injection, and other aspects of engine operation.

Figure 7:
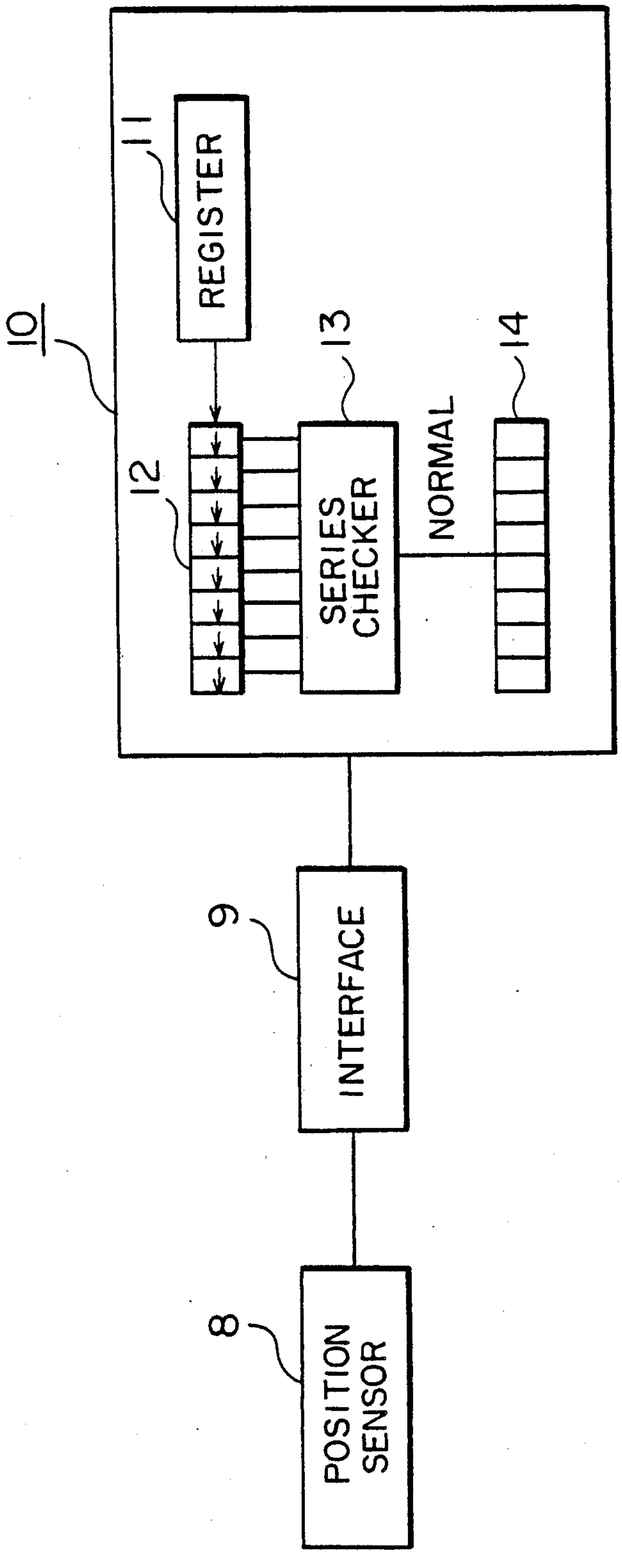
FIG. 7 is a block diagram of a second embodiment of the present invention.

FIG. 7 illustrates a second embodiment of the present invention. It differs from the embodiment of FIG. 4 in that includes a second shift register 14 which is connected to the checking device 13. It receives the first data series (the contents of the first shift register 12) only when the first series is determined to be a normal series. When the contents of the first shift register 12 are transferred to the second shift register 14, they become a second series which is provided to the engine controller for use in controlling the engine.

Figure 8:
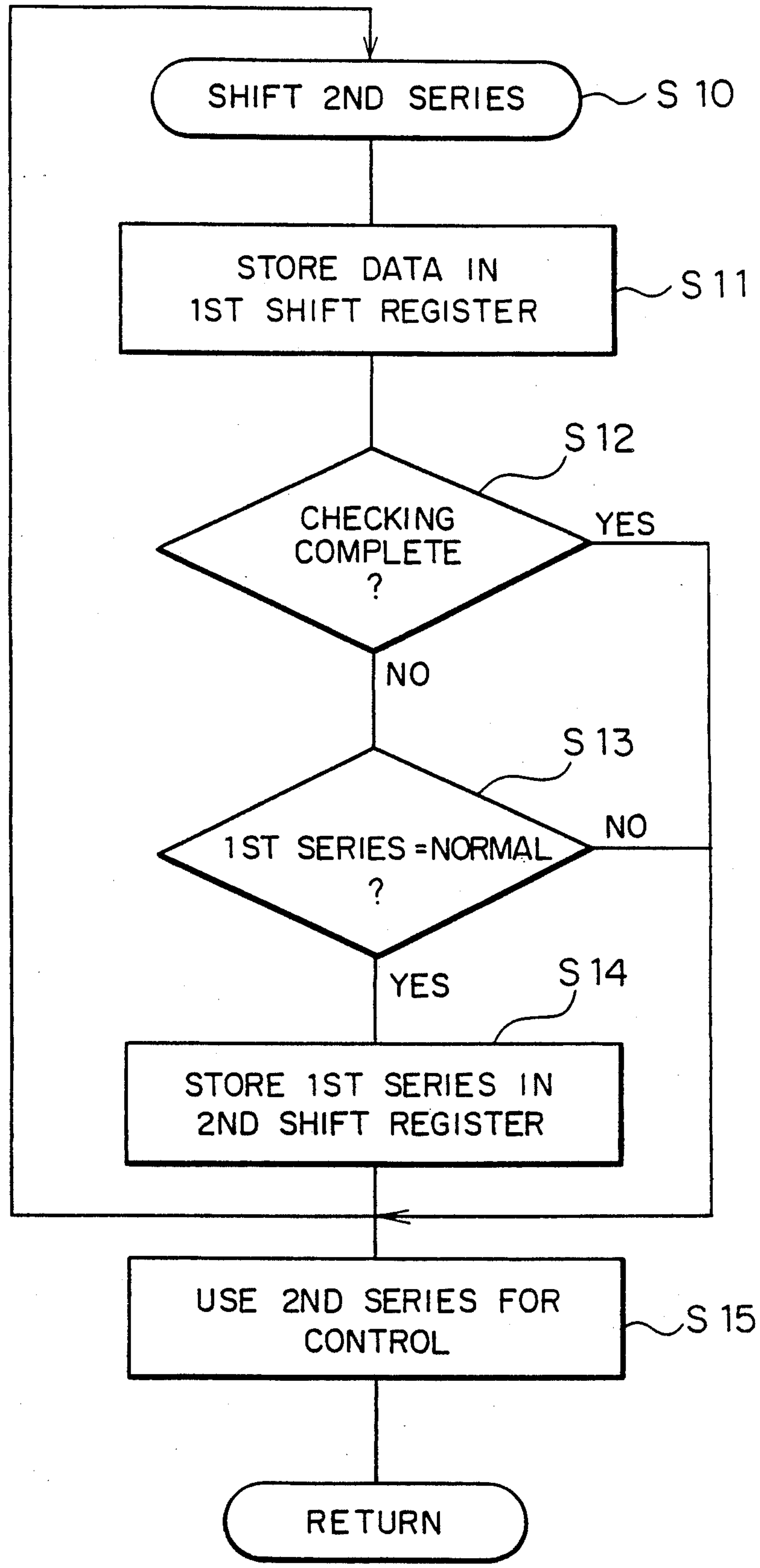
FIG. 8 is a flow chart of the operation of the embodiment of FIG. 7.

FIG. 8 is a flow chart of the operation of the embodiment of FIG. 7. In Step S11, the result of cylinder recognition for each cylinder (a 1 or a 0) is successively stored as a series of data in register 11. Each time a data value is input to register 11, the first shift register 12 shifts in the direction of the arrow, and a series of data for two engine cycles is stored as a first series. Next, in Step S12, it is determined whether the checking of the first series is complete. If checking has not been completed, in Step S13, the checking device 13 checks whether the first series is a normal series. If it is a normal series, then in Step S14, the first series is stored in the second shift register 14 as a second series. Thereafter, in each cycle, the routine recycles to Step S10, in which the second shift register 14 is shifted. The above-described operations are then repeated, and the second series of data is reflected in control.

Figure 9:
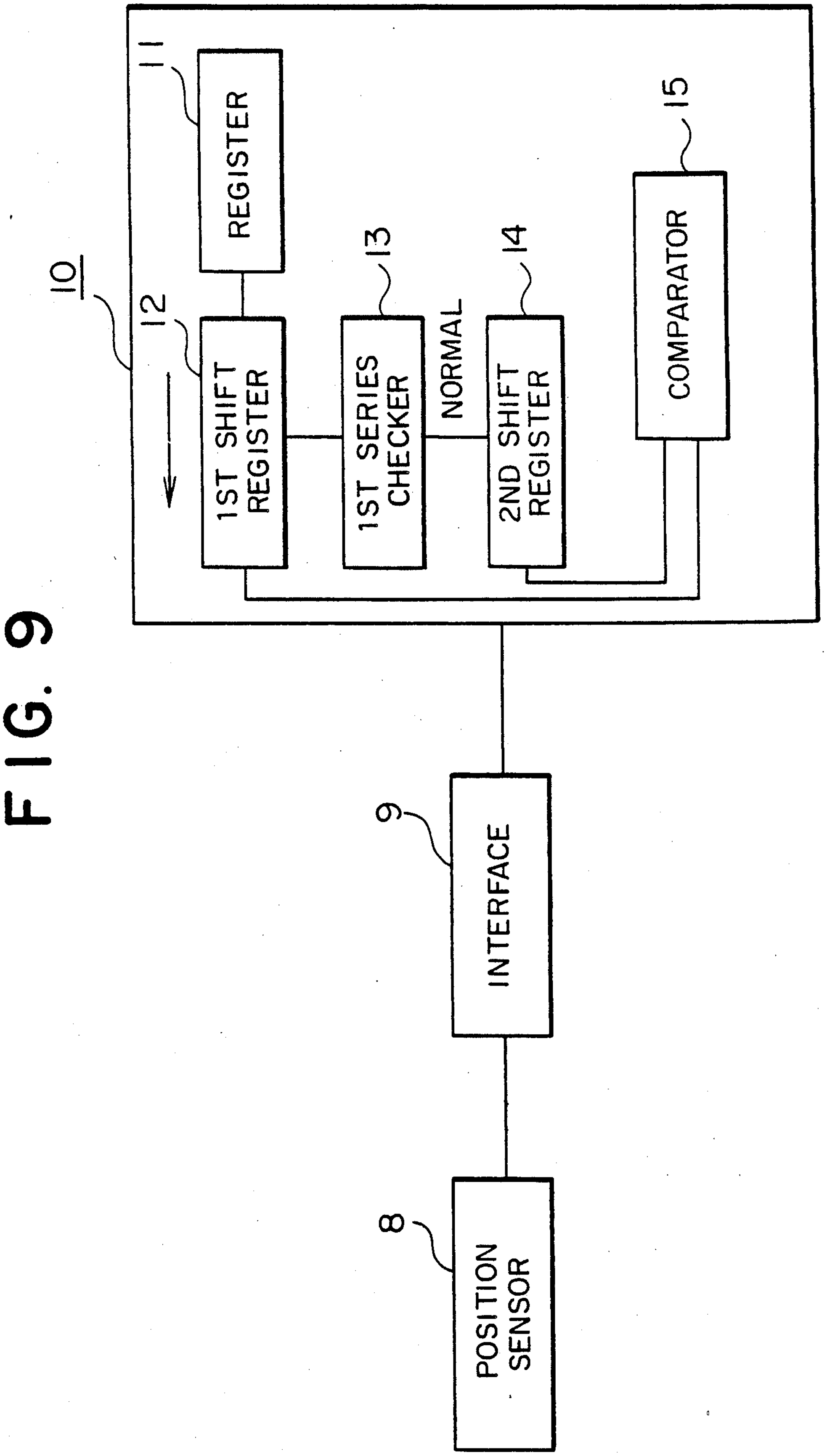
FIG. 9 is a block diagram of a third embodiment of the present invention.

FIG. 9 illustrates a third embodiment of the present invention. It differs from the embodiment of FIG. 7 in that it further includes a comparator 15 which compares the contents of the first shift register 12 (the first series) with the contents of the second shift register 14 (the second series) to make sure that the first series was correctly transferred between the two shift registers. The second series in the second shift register 14 is sent to the engine controller only when the comparator 15 has confirmed that it matches the first series.

Figure 10:
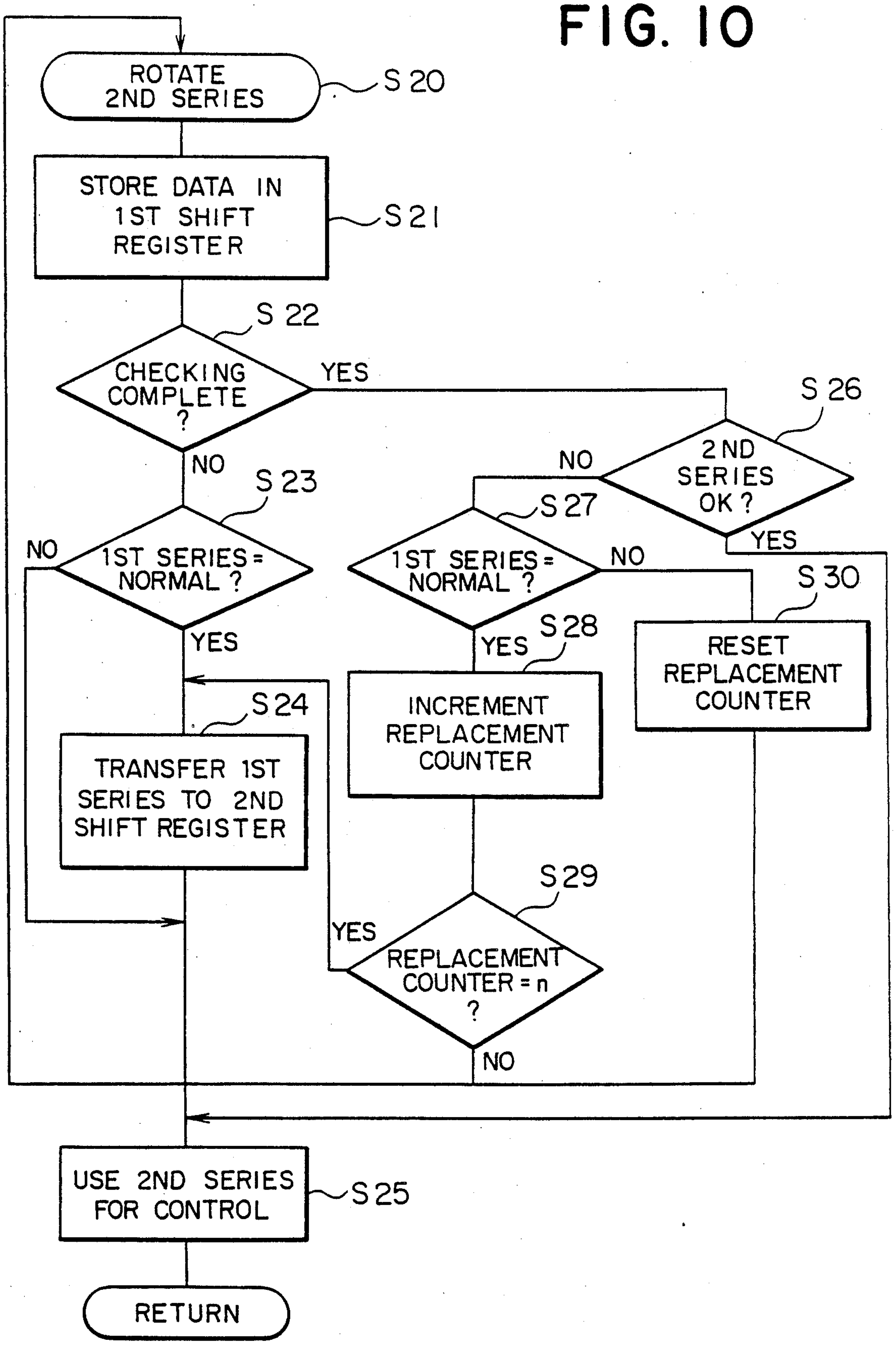
FIG. 10 is a flow chart of the operation of the embodiment of FIG. 9.

FIG. 10 is a flow chart of the operation of this embodiment. In Step S21, the cylinder recognition data for each cylinder is successively stored as a series of data in register 11. Each time a data value (a 1 or a 0) is input to register 11, the first shift register 12 shifts in the direction of the arrow, and a series of data for two engine cycles is stored as a first series in the first shift register 12. Next, in Step S22, it is determined whether the checking of the first series has been completed. If checking has not been completed, in Step S23, the checking device 13 checks whether the first series is a normal series. If it is a normal series, then in Step S24, the first series is stored in the second shift register 14 as a second series. Thereafter in each cycle, the routine recycles to Step S20 in which the second series is rotated. The above-described steps are then repeated and new cylinder recognition data is obtained. In Step S25, the second series is provided to the engine controller and reflected in engine control.

In Step S22, if checking of the first series has been completed, in Step S26, the first series in the first shift register 12 and the second series in the second shift register 14 are compared with one another by the comparator 15. If the second series is the same as the first series, then the routine jumps to Step S25, and the second series is provided to the engine controller. If the second series is not the same as the first series, then in Step S27, it is determined whether the first series is a normal series. If it is normal, then in Step S28, a second series replacement counter is incremented by 1. In Step 27, if it is determined that the first series is not a normal series, then in Step S30, the second series replacement counter is reset, and the routine recycles to Step S20. Steps S26–S29 are then repeated until in Step S29, the second series replacement counter reaches a prescribed value n, upon which the routine jumps to Step S24 and the first series is stored in the second shift register 14 as a second series, thereby replacing the abnormal second series which was previously stored in the second shift register 14 with a normal series.

Thus, in the event that a normal first series is incorrectly transferred from the first shift register 12 to the second shift register 14 and the second series becomes an abnormal series, the abnormal second series is not provided to the engine controller and is replaced with a normal series.

What is claimed is:

1. A cylinder recognition apparatus for a multi-cylinder internal combustion engine comprising:

means for generating a series of data values indicating the identity of each cylinder of the engine;

a first shift register for sequentially storing the data values for a prescribed number of engine cycles as a first series;

an engine controller; and checking means for checking if the first series is a normal series and providing the first series to said engine controller only if the first series is a normal series.

2. A cylinder recognition apparatus as claimed in claim 1, further comprising a second shift register connected between the checking means and the engine controller in which the first series is stored by the checking means as a second series when the first series is determined to be a normal series.

3. A cylinder recognition apparatus as claimed in claim 2, further comprising means for comparing the first series with the second series and providing the second series to the engine controller only when the second series is the same as the first series.

4. A cylinder recognition apparatus as claimed in claim 3, further comprising means for replacing the second series with a normal series when the second series is not the same as the first series.

* * * * *